(12) United States Patent
D'Antonio (10) Patent No.: US 9,071,091 B2
(45) Date of Patent: Jun. 30, 2015

(54) ROTOR CAN

(75) Inventor: Sébastien D'Antonio, Thorsø (DK)

(73) Assignee: Grundfos Management a/s, Bjerringbro (DK)

( * ) Notice: Subject to any disclaimer, the term of this patent is extended or adjusted under 35 U.S.C. 154(b) by 446 days.

(21) Appl. No.: 13/322,624

(22) PCT Filed: Aug. 31, 2010

(86) PCT No.: PCT/EP2010/005323
§ 371 (c)(1),
(2), (4) Date: Nov. 28, 2011

(87) PCT Pub. No.: WO2011/026597
PCT Pub. Date: Mar. 10, 2011

(65) Prior Publication Data
US 2012/0146440 A1    Jun. 14, 2012

(30) Foreign Application Priority Data
Sep. 5, 2009  (EP) .................. 09011395

(51) Int. Cl.
*H02K 5/128*  (2006.01)
*H02K 15/02*  (2006.01)
*F04D 13/06*  (2006.01)

(52) U.S. Cl.
CPC ............... *H02K 5/128* (2013.01); *H02K 15/02* (2013.01); *F04D 13/0626* (2013.01); *F04D 13/0633* (2013.01); *F04D 13/064* (2013.01)

(58) Field of Classification Search
CPC ........... H02K 9/19; H02K 9/22; H02K 9/197; H02K 5/1285
USPC ............ 310/85–87; 428/299.1, 300.7, 301.4; 156/187, 188
See application file for complete search history.

(56) References Cited

U.S. PATENT DOCUMENTS

| | | | | |
|---|---|---|---|---|
| 3,163,182 A | * | 12/1964 | Sandow et al. | 138/144 |
| 3,791,898 A | * | 2/1974 | Remi | 156/143 |
| 3,990,136 A | * | 11/1976 | Hishida | 29/893.37 |
| 4,010,054 A | * | 3/1977 | Bradt | 156/173 |
| 4,930,201 A | * | 6/1990 | Brown | 29/598 |
| 5,048,441 A | * | 9/1991 | Quigley | 114/90 |
| 5,221,391 A | * | 6/1993 | Kittaka et al. | 156/171 |
| 5,928,798 A | * | 7/1999 | Buongiorno et al. | 428/515 |

(Continued)

FOREIGN PATENT DOCUMENTS

| | | |
|---|---|---|
| DE | 4030711 A1 | 4/1992 |
| EP | 1 231 048 A2 | 8/2002 |

(Continued)

OTHER PUBLICATIONS

Int'l Search Report issued on Nov. 2, 2010 in Int'l Application No. PCT/EP2010/005323.

(Continued)

*Primary Examiner* — Naishadh Desai
(74) *Attorney, Agent, or Firm* — Panitch Schwarze Belisario & Nadel LLP (57) ABSTRACT

A rotor can for a wet running electric motor includes an inner layer (2) made from a thermoplastic material which is at least partly surrounded by a supporting layer (4) in form of a thermoplastic tape layer attached to the outside of the inner layer (2).

14 Claims, 6 Drawing Sheets

(56) References Cited

U.S. PATENT DOCUMENTS

| | | | | |
|---|---|---|---|---|
| 5,935,704 | A * | 8/1999 | Happy | 428/361 |
| 6,047,756 | A * | 4/2000 | Uchida | 156/393 |
| 6,963,151 | B2 * | 11/2005 | Van Dine | 310/87 |
| 7,264,450 | B2 * | 9/2007 | Christensen | 417/53 |
| 7,750,246 | B2 | 7/2010 | Ferlier et al. | 174/120 R |
| 7,839,036 | B2 * | 11/2010 | Hansen et al. | 310/87 |
| 2002/0160138 | A1 * | 10/2002 | Bergmann et al. | 428/36.3 |
| 2004/0032032 | A1 * | 2/2004 | Erickson | 261/93 |
| 2006/0060289 | A1 * | 3/2006 | Carter et al. | 156/187 |
| 2008/0136277 | A1 * | 6/2008 | Esders | 310/87 |
| 2008/0257482 | A1 * | 10/2008 | Jeruzal et al. | 156/188 |
| 2009/0026878 | A1 * | 1/2009 | Hansen et al. | 310/272 |
| 2010/0218839 | A1 * | 9/2010 | Conley et al. | 138/130 |

FOREIGN PATENT DOCUMENTS

| | | |
|---|---|---|
| EP | 2040352 A1 | 3/2009 |
| JP | H11-89158 A | 3/1999 |
| JP | 2001-231213 A | 8/2001 |

OTHER PUBLICATIONS

Office Action Sep. 30, 2014 for Patent Application No. JP2012-527225.

* cited by examiner

ROTOR CAN

CROSS-REFERENCE TO RELATED APPLICATIONS

This application is a Section 371 of International Application No. PCT/EP2010/005323, filed Aug. 31, 2010, which was published in the English language on Mar. 10, 2011, under International Publication No. WO 2011/026597 A and the disclosure of which is incorporated herein by reference.

BACKGROUND OF THE INVENTION

The present invention refers generally to a rotor can for a wet running electric motor, and, in particular, for a pump unit, for example a circulator pump for a heating or air conditioning system.

Wet running motors comprise a rotor can between the stator and the rotor of the motor. Up to now these rotor cans are commonly manufactured from stainless steel. However, it is also known to make such a rotor can from plastic material. Since inside the rotor can there is a fluid under pressure the rotor can must be resistant against this inner pressure, in particular keep its predefined shape also under high inner pressure and high temperature.

Therefore, for use with high pressure and temperature it is known to reinforce the plastic material of the rotor can by fibers. The known rotor cans are made from a thermosetting plastic which has to be cured by heating. This results in a time consuming manufacturing process.

BRIEF SUMMARY OF THE INVENTION

It is an objective of a preferred embodiment of the present invention to provide an improved rotor can for a wet running electric motor made from a plastic material which allows an easy, less time consuming manufacturing process and has a high stability and thin walls.

The above objective is achieved by a rotor can having an inner layer made from a thermoplastic material which is at least partly surrounded by a supporting layer in form of a thermoplastic tape layer attached to the outside of the inner layer, and a pump unit having the above features. Improved preferred embodiments are disclosed in the following description and the drawings.

The rotor can for a wet running electric motor according to a preferred embodiment of the present invention comprises an inner layer made from a thermoplastic material. This inner layer may be produced by injection molding. This inner layer is at least partly surrounded by a supporting layer. The supporting layer is attached to the outside of the inner layer and is made from a thermoplastic tape attached to the outside of the inner layer. The thermoplastic tape preferably has a high tensile strength in its longitudinal direction, for example, in circumferential direction when wound around the inner layer. Thus, the thermoplastic tape layer reinforces the inner layer against deformation due to the inner pressure acting on the inside of the inner layer and/or high temperature acting on the plastic material. Preferably, the thermoplastic tape layer is at least attached to the cylindrical section of the rotor can which inside the motor is arranged between the stator and the rotor. The closed top end section of the rotor can may be free of a thermoplastic tape layer. Instead, the inner layer may have a greater thickness in this section of the rotor can.

The thermoplastic tape layer preferably is attached to the inner layer in a heating process. Preferably, the inner layer and the supporting layer are heated when the supporting layer is attached to the outside of the rotor can, for example, wound around the rotor can. Furthermore, it is preferred to press the supporting layer onto the inner layer, so that the attachment is accomplished by a combination of melting and pressure for consolidation of the plastic material. The heating process can be initiated by electric induced warming up of the tape. If the tape is enforced by electric conducting fabrics for example carbon fibers these can be used as electrical resistances for warming up the tape.

Instead of directly winding the tape layer around the rotor can, it is also possible to wind the tape layer around a core, for example, a metal core to produce the supporting layer independently from the inner layer. The supporting layer manufactured in this way can be inserted into an injection mold for molding the inner layer and then the inner layer is molded directly inside the premanufactured supporting layer by an injection molding process.

Preferably, the inner layer is made from a fiber reinforced thermoplastic material. There may be aramid, carbon or glass fibers or the like in the material of the inner layer.

Further, it is preferred that the supporting layer is a fiber reinforced thermoplastic tape layer. The tape layer may be reinforced by glass, carbon or aramid fibers or the like. Preferably, these are continuous fibers arranged in the longitudinal direction of the tape layer, so that when wound around the inner layer the reinforcement fibers extend substantially in circumferential direction of the rotor can. This is a direction in which the tape has to absorb the highest tensile stress in the rotor can when a pressure is applied to the inside of the rotor can.

According to a preferred embodiment at least one end section of the rotor can is not surrounded by the supporting layer. This may in particular be the closed end section of the rotor can. This end section normally is not arranged between a rotor and stator, but axially outside the gap between rotor and stator. Therefore, the section may have a greater wall thickness so that a reinforcement by the supporting layer is not required.

This means, in this preferred embodiment the end section of the inner layer has a greater thickness, for example, wall thickness than the middle section of the rotor can which is arranged in the gap between rotor and stator of the motor.

In a further preferred embodiment the rotor can comprises a bearing for a rotor shaft which bearing is molded in by the thermoplastic material of the inner layer. For example, the bearing may be inserted into the injection mold prior to the molding process, so that the thermoplastic material of the inner layer during injection molding flows around this bearing and the bearing is molded into the inner layer. This allows an easier and secure connection of the bearing inside the rotor can. For holding the bearing, the inner layer of the rotor can may have a greater thickness around the bearing to absorb the forces acting on the rotor can in the region surrounding the bearing.

Instead directly molding in the bearing, a bearing housing for a bearing of a rotor shaft may be molded in by the thermoplastic material of the inner layer. This means, a bearing housing is formed in the inner layer during the injection molding process of the inner layer. Alternatively, a premanufactured bearing housing, in particular a bearing housing from, for example, metal, may be inserted into the injection mold prior to molding the inner layer so that bearing housing is molded in by the thermoplastic material during the injection molding process. Later, when assembling the pump the bearing may be set into this bearing housing. Thus, the bearing housing forms a defined support for the bearing.

Preferably, the bearing housing is made from the same thermoplastic material as the inner layer. This ensures a secure junction between the bearing housing and the inner layer of the rotor can. Preferably, the bearing housing is molded in by the thermoplastic material of the rotor can during an injection molding process. Thus, the bearing housing and the material of the rotor can are melted together during the injection molding process.

As described before preferably the inner layer is an injection molded part. However, the inner layer may also be formed in another suitable manner. For example, the inner layer may be produced from a thermoplastic tube.

According to a further preferred embodiment the thermoplastic tape layer is prestressed so that a radially inwardly directed force is supplied to the inner layer. This may be achieved by stretching the tape before winding it around the inner layer.

Further, it is preferred that the tape layer is attached to the inner layer substantially without overlap. This means that there is no overlap between two consecutive laid ribbons or windings of the tape. However, the last winding of the tape may have an overlap, since it is preferred that the last winding around the inner layer extends in a plane perpendicular to the longitudinal axis of the rotor can.

According to a special preferred embodiment of the present invention two tape layers may be attached to the inner layer. These two layers may be arranged superposed on the outside of the inner layer. The two tape layers may be wound in opposite directions around the inner layer. By such winding an improved reinforcement of the inner layer can be achieved.

In a preferred embodiment the rotor can has an end flange surrounding an open end of the rotor can. Preferably, this end flange is integrally formed with the inner layer, for example by an injection molding process. The end flange is used for fixing and sealing the rotor can, for example, on a pump housing.

According to a further preferred embodiment the matrix of the tape is the same as the matrix of the inner layer, for example, the basic materials of the inner layer and the supporting layer are the same, so that a physical and/or chemical bonding can be achieved between the tape and the inner layer. This is a great advantage compared to the thermosetting materials used in the prior art rotor cans.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "bottom" and "top" designate directions in the drawings to which reference is made. The word "inwardly" refers to a direction away from the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, a rotor can as shown in FIGS. 1-4 preferably has an inner layer 2 made from a thermoplastic material. The inner layer 2 is preferably formed by injection molding. On a circumferential outside of the inner layer 2, the inner layer 2 is surrounded by a supporting layer 4 in form of a tape layer. The tape layer is preferably manufactured by winding a thermoplastic tape around the inner layer 2. The inner layer 2 and the tape of the supporting layer 4 may be fiber reinforced, for example, by glass, aramid or carbon fibers. The reinforcing fibers of the thermoplastic tape are extending continuously in longitudinal direction of the tape so that the fibers are circumferentially wound around the inner layer 2. By this, the reinforcement fibers may absorb the tensile stress induced by the pressure acting onto the inside of the rotor can.

The inner layer 2 and the supporting layer 4 are preferably formed from the same thermoplastic material so that there can be achieved a chemical and/or physical bonding between inner layer 2 and supporting layer 4. Preferably both, the inner layer 2 and the thermoplastic tape of the supporting layer 4 are heated when winding the supporting layer around the inner layer 2.

Figure 1:
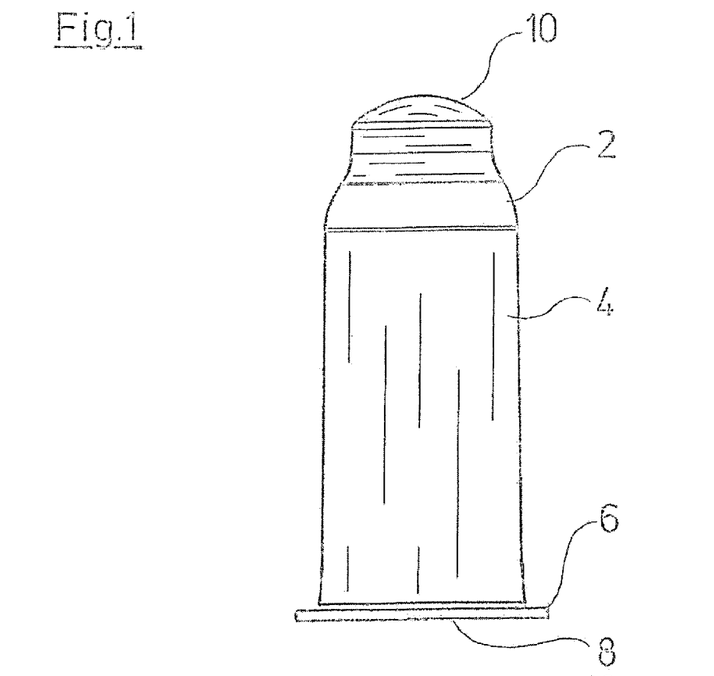
FIG. 1 is a rotor can according to a first preferred embodiment of the present invention.
Figure 2:
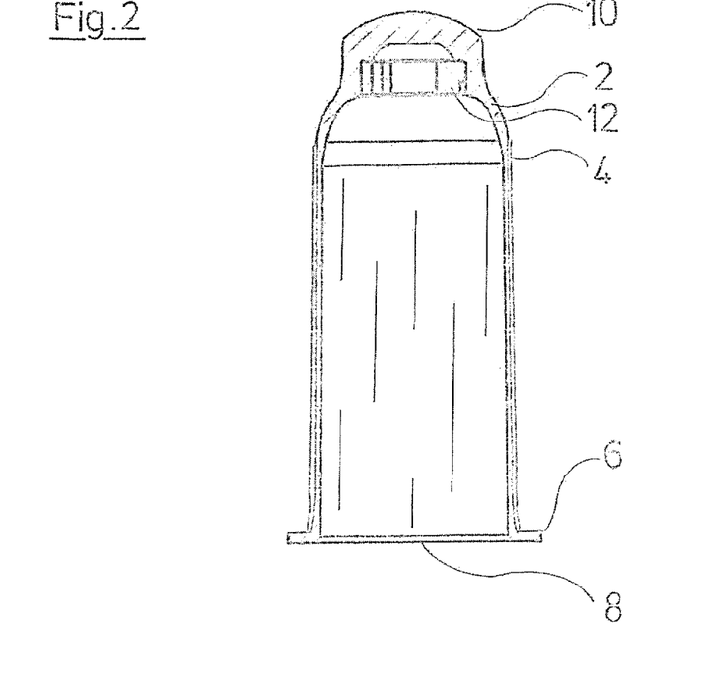
FIG. 2 is a cross-sectional view of the rotor can according to FIG. 1.

In the preferred embodiment shown in FIGS. 1 and 2, the rotor can has an end flange 6 surrounding the open end 8 of the rotor can. The end flange 6 is used to align, seal and fix the rotor can to a pump housing.

The end opposite to the open end 8 is a closed end 10 of the rotor can. At the closed end 10 inside the rotor can a bearing 12 for a rotor shaft is arranged. The bearing 12 may be held in a bearing housing formed in the inside of the inner layer 2. Further, the bearing 12 may be molded in by the material of the inner layer during injection molding.

Figure 3:
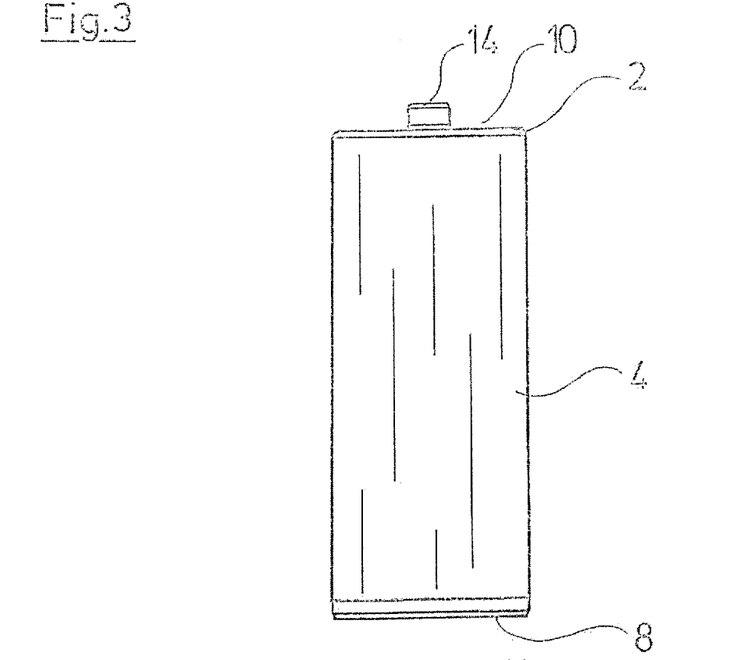
FIG. 3 is a rotor can according to a second preferred embodiment of the present invention.
Figure 4:
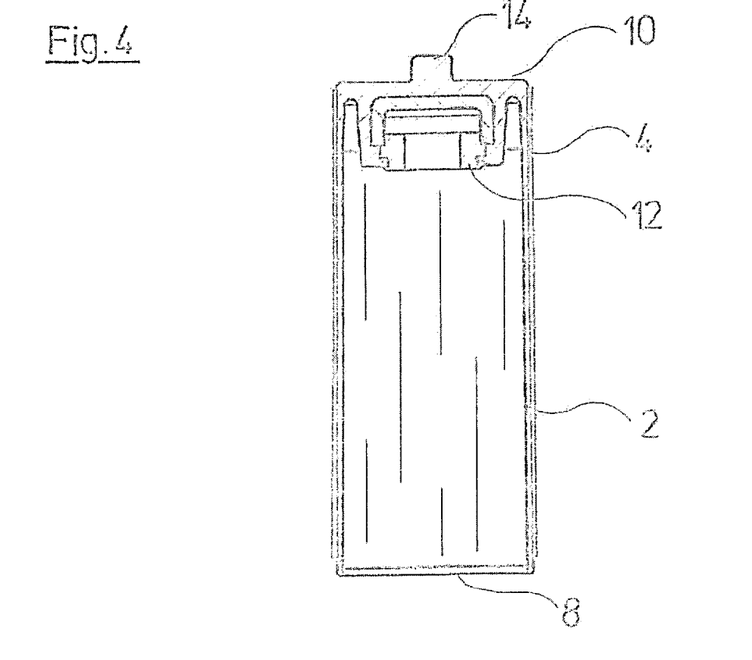
FIG. 4 is a cross-sectional view of the rotor can shown in FIG. 3.

Compared to the preferred embodiment shown in FIGS. 1 and 2, the closed end 10 of the preferred embodiment shown in FIGS. 3 and 4 is flat, for example, extends substantially perpendicularly to the longitudinal axis of the rotor can. Further, the rotor can according to FIGS. 1 and 2 has a light conical shape, whereas the rotor can according to the preferred embodiment shown in FIGS. 3 and 4 has a basically cylindrical shape. In the preferred embodiment shown in FIGS. 3 and 4, the closed end 10 has an axially extending stop means 14 projecting in axial direction from the closed end 10. The stop means is used to fix the rotor can with its closed end 10 inside a stator housing.

Figure 5:
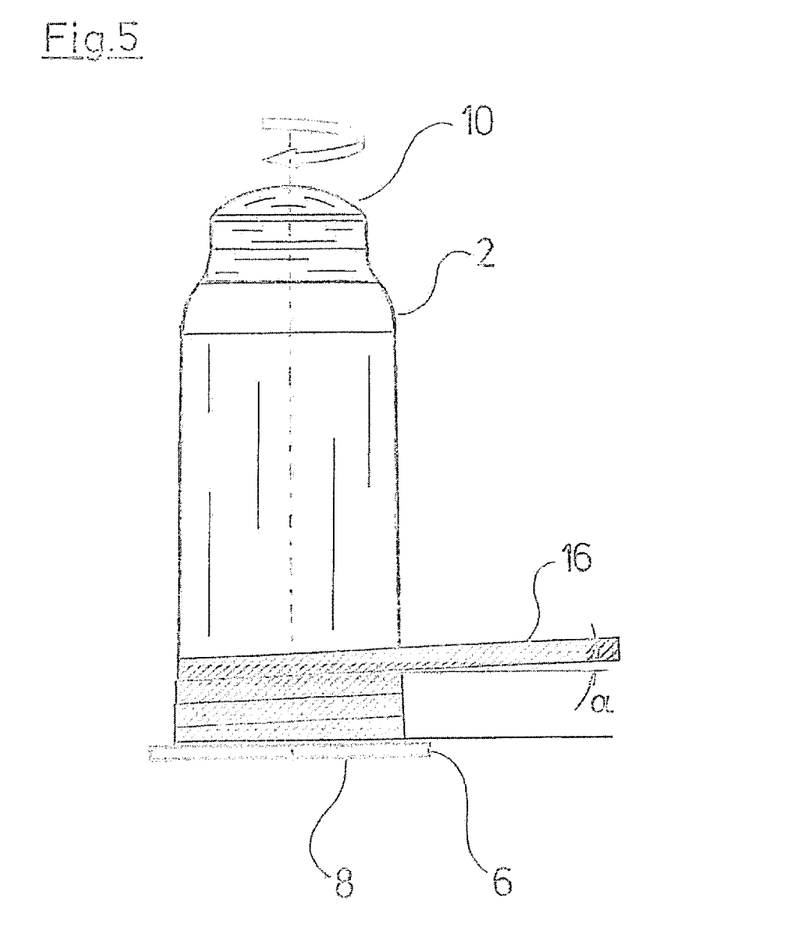
FIG. 5 schematically shows how a supporting layer is applied to an inner layer according to a first preferred method of the present invention.

The supporting layer 4 may be applied to the inner layer 2 as shown in FIG. 5. In this preferred embodiment the inner layer 2 is manufactured in a first step by injection molding. In a second step the supporting layer in form of a thermoplastic, fiber reinforced tape is wound around the inner layer 2 starting from the open end 8. The first ribbon or winding of the thermoplastic tape 16 is wound on a plane perpendicular to the longitudinal axis of the rotor can, for example, parallel to the end flange 6. The following windings or ribbons are wound in a slight angle α in a screw like manner around the cylindrical portion of the inner layer 2. This winding is carried out in a manner that the single windings of the thermoplastic tape do not overlap each other. Before and during the winding process the inner layer 2 and the tape 16 may be heated. Further, the first winding may be fixed by welding.

In FIG. 5 the winding process is started from the open end 6. However, it is also possible to start the winding at the closed end 10. In case that two layers of thermoplastic tape are wound around the inner layer 2 it is also possible to start the winding of the first layer at the closed end 10 and to start the winding of the second layer from the open end 8, or vice versa. Further, it could also be started and stopped in the middle of the rotor can seen in the longitudinal direction.

Figure 6A:
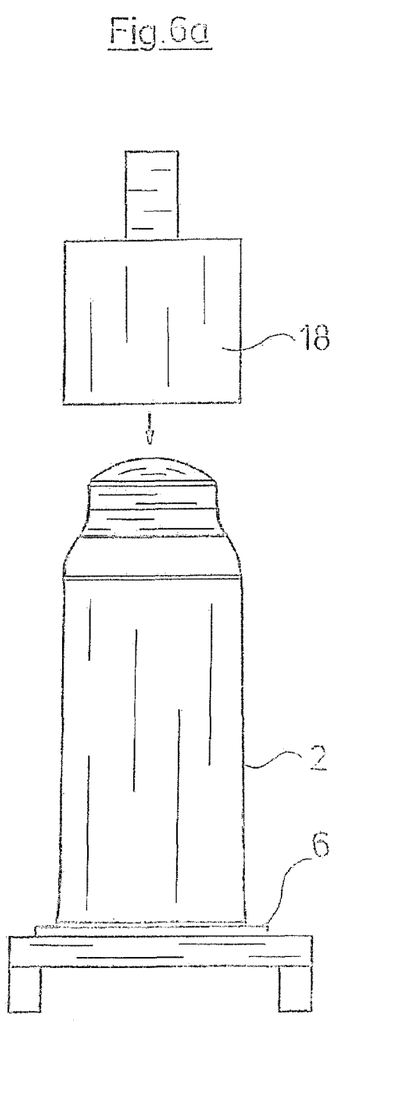
FIG. 6a and FIG. 6b schematically show how a tape layer is applied to the inner layer according to a second preferred method of the present invention.
Figure 6B:
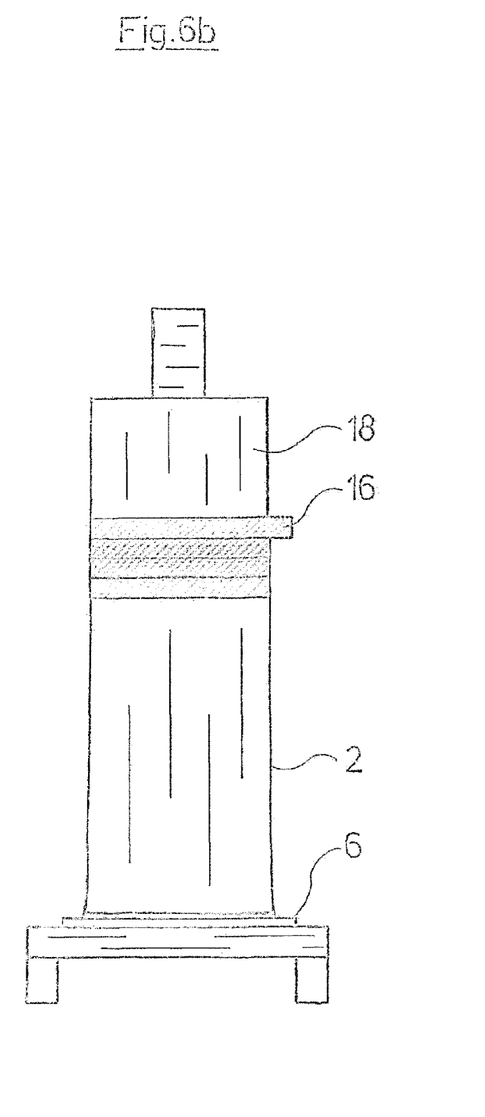

To avoid the welding of the first winding layer on the inner layer 2 it is possible to use a metallic adapter 18 as shown in FIG. 6a and FIG. 6b. As shown in FIG. 6a, the metallic adapter is set onto the closed end 10 of the inner layer 2 which has been formed before by injection molding. The metallic adapter 18 has an inner shape corresponding to the shape of the closed end 10 of the rotor can, so that the closed end 10 of the rotor can fits into the metallic adapter 18 so that the outer circumferential surface of the metallic adapter 18 is aligned with the outer circumferential surface of the cylindrical portion of the inner layer 2. As shown in FIG. 6b, the winding of the tape 16 is started on the metallic adapter 18. Thus, the first winding can be welded, for example, closed by welding on the metallic adapter 18 so that the inner layer 2 is not influenced by this welding process. Then, the thermoplastic tape 16 is wound around the inner layer 2 as described with reference to FIG. 5. After the winding the layer formed by the thermoplastic tape 16 is cut circumferentially near the closed end at the axial end of the metallic adapter 18. Then, the metallic adapter 18 can be removed.

According to the preferred method shown in FIGS. 5 and 6, the supporting layer is attached to the inner layer 2 after injection molding of the inner layer 2. However, it is also possible to first form the supporting layer by winding a thermoplastic tape 16 and then in a second step to form the inner layer by injection molding directly onto the inside of the supporting layer 4. This is shown in FIGS. 7a to 7d.

Figure 7A:
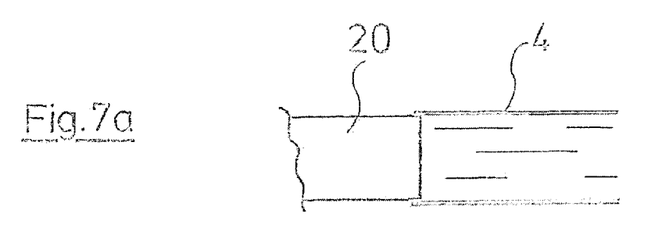
FIG. 7a-FIG. 7d show a method of applying the supporting layer to the inner layer according to a third preferred embodiment of the present invention.

In the first step the supporting layer 4 is formed on a metallic core 20 by winding the thermoplastic tape 16 around this core 20. After the winding the core 20 is removed from the inside of the so formed supporting layer 4 as shown in FIG. 7a.

Figure 7B:
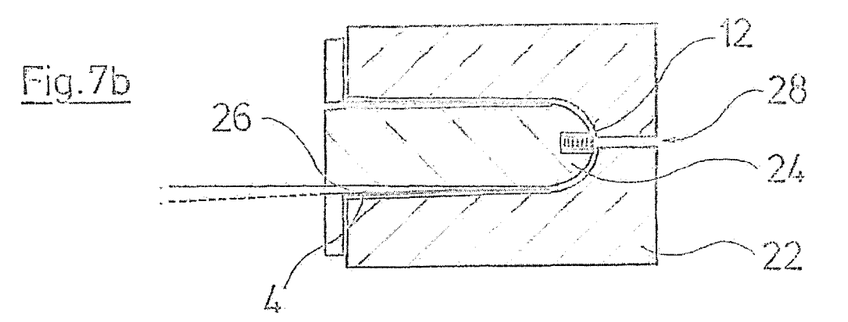

In the next step the supporting layer 4 formed by winding the tape 16 and a bearing 12 are inserted into a mold 22 for injection molding. The mold is formed by an outer part 22 and an inner part 24. This supporting layer 4 is inserted into the outer part 22. Then the inner part 24 of the mold is inserted into the supporting layer 4 so that a gap 26 is formed between part 22 and 24 of the mold. The bearing 12 is supported by the inner part 24 of the mold. This is shown in FIG. 7b.

Figure 7C:
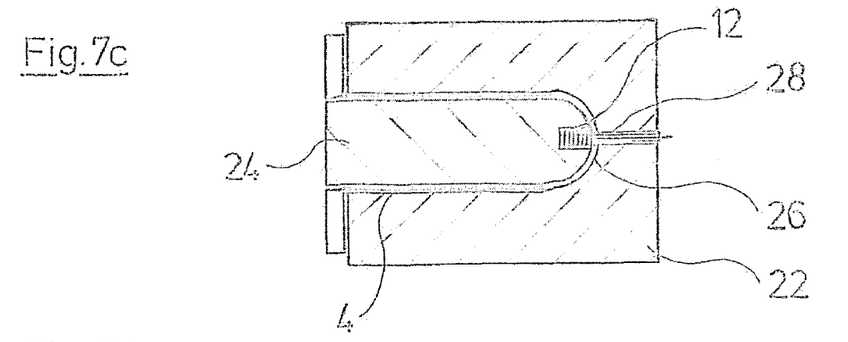
Figure 7D:
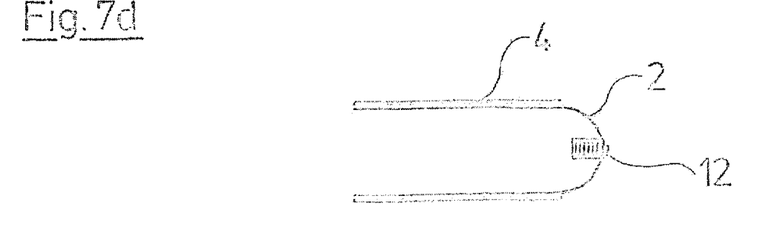

In the next step as shown in FIG. 7c through an opening 28 in the outer part of the mold 22 a thermoplastic material is injected into the gap 26. The thermoplastic material flows inside the gap between the supporting layer 4 and the inner part 24 of the mold and forms the inner layer 2 inside the outer supporting layer 4 as shown in FIG. 7d.

Figure 8:
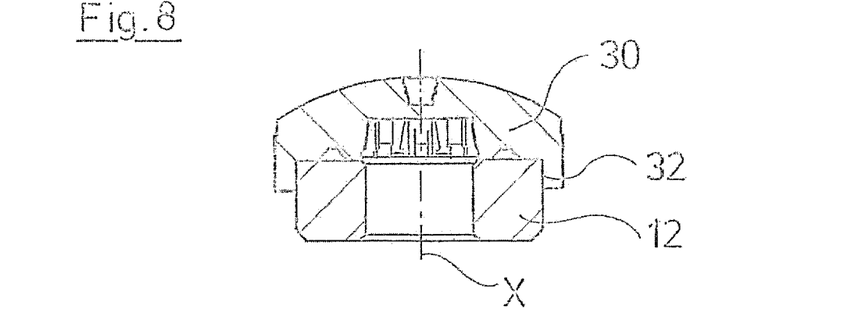
FIG. 8 is a cross-sectional view of a bearing housing with a bearing inserted.

As described above and shown in FIG. 8 the bearing 12 may be held in a bearing housing 30. The bearing housing 30 has a receptacle 32 into which the bearing 12 is inserted. The bearing housing 30 preferably is made from a plastic material, further preferred from the same plastic material as the inner layer of the rotor can. This ensures a secure connection between the bearing housing 32 and the inner layer 2 of the rotor can during an injection molding process. Both parts may be melted together. The bearing housing 30 may be premanufactured and inserted into the mold prior to the injection molding, so that the bearing housing 30 is molded in by the thermoplastic material of the inner layer during the injection molding process of the inner layer. The bearing 12 may be inserted into the receptacle prior to the injection molding process or after the injection molding process.

Figure 9:
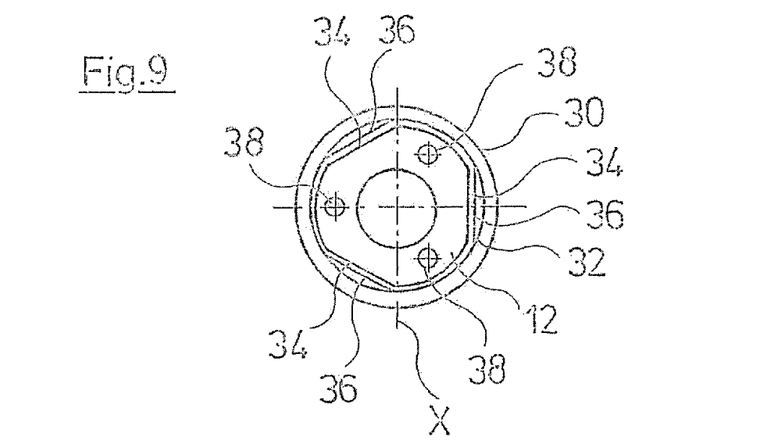
FIG. 9 is a bottom view of a bearing housing with a bearing inserted.

As shown in FIG. 9 the bearing 12 may have an outer contour which is not cylindrical to prevent a rotation of the bearing relative to the bearing housing 30. In the example shown in FIG. 9, there are three flat surfaces 34 provided on the circumference of the bearing 12. The receptacle 32 has a cylindrical shape. Thus, between the flat surfaces 34 and the inner circumference of the receptacle 32 free spaces 36 are formed. These free spaces 36 are filled with plastic material during the injection molding process and a positive joint between the receptacle and the bearing is achieved. Thus, a bearing 12 cannot rotate inside the receptacle 32. Further, the bearing 12 has through holes 38 for ventilation and lubrication which extend parallel to the rotational axis X of the rotor shaft from one end surface to the opposite other surface. The entering of injection material, for example, thermoplastic material during the injection molding process, is prevented by the core forming the inner shape of the rotor can during injection molding.

Figure 10:
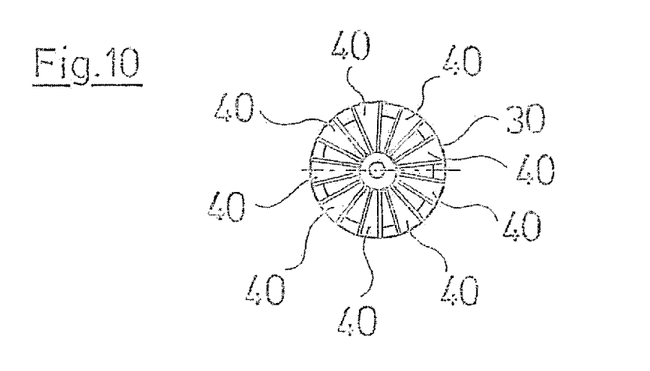
FIG. 10 a top view on a side of the bearing housing to be joined with the rotor can.

As shown in FIG. 10 the end face of the bearing housing 30 opposite to the receptacle 32 is provided with radially extending ribs 40. These ribs 40 stiffen the bearing housing 30 to prevent the bearing housing from collapsing. The bearing housing 30 includes holes or recesses communicating with the through holes 38 in the bearing to allow ventilation and lubrication through these through holes. In case that the bearing housing 30 should collapse during the injection molding process these recesses or holes may be closed. Therefore, it is important to prevent the bearing housing 30 or bearing holder from collapsing.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:
1. A rotor can for a wet running electric motor, the rotor can comprising:
  an inner layer (2) made from a thermoplastic material which is at least partly surrounded by a supporting layer (4) in the form of a first thermoplastic tape layer (16) wound around and attached to an outside of the inner layer (2) using a heating process; and a bearing (12) for a rotor shaft, the bearing (12) being molded in by the thermoplastic material of the inner layer (2).

2. The rotor can according to claim 1, wherein the inner layer (2) is a fiber reinforced thermoplastic material.

3. The rotor can according to claim 2, wherein the supporting layer (4) is a fiber reinforced thermoplastic tape layer 16.

4. The rotor can according to claim 1, wherein at least one end section (10) of the rotor can is not surrounded by the supporting layer (4).

5. The rotor can according to claim 1, wherein an end section (10) of the inner layer (2) has a greater thickness than a middle section of the rotor can.

6. The rotor can according to claim 1, wherein the inner layer (2) is an injection molded part.

7. The rotor can according to claim 1, wherein the first thermoplastic tape layer (16) is prestressed so that a radially inwardly directed force is applied to the inner layer (2).

8. The rotor can according to claim 1, wherein the first thermoplastic tape layer (16) is attached to the inner layer (2) without overlap.

9. The rotor can according to claim 1, further comprising a second thermoplastic tape layer attached to the inner layer (2).

10. The rotor can according to claim 9, wherein the second thermoplastic tape layer is wound around the outside of the inner layer 2 in a direction opposite to the first thermoplastic layer.

11. The rotor can according to claim 1, wherein an end flange (6) surrounds an open end (8) of the rotor can.

12. A pump unit comprising an electric wet running motor, wherein the motor comprises a the rotor can according to claim 1.

13. A rotor can for a wet running electric motor, the rotor can comprising:
 an inner layer (2) made from a thermoplastic material which is at least partly surrounded by a supporting layer (4) in the form of a first thermoplastic tape layer (16) wound around and attached to an outside of the inner layer (2) using a heating process, wherein a bearing housing for a bearing (12) of a rotor shaft is molded in by the thermoplastic material of the inner layer (2).

14. The rotor can according to claim 13, wherein the bearing housing is made from the same thermoplastic material as the inner layer (2).

\* \* \* \* \*